No. 617,216.　　　　　　　　　　　　　　　　Patented Jan. 3, 1899.
J. ARNOT.
PILOT WIRE ROD FOR ELECTRICAL CONDUITS.
(Application filed May 24, 1898.)
(No Model.)　　　　　　　　　　　　　　　　4 Sheets—Sheet 1.
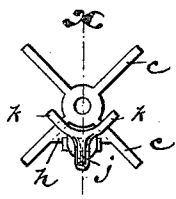
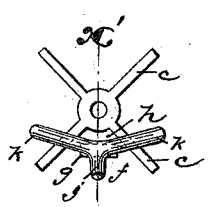
Fig. 3.　　Fig. 4.
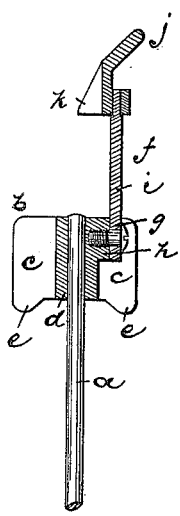
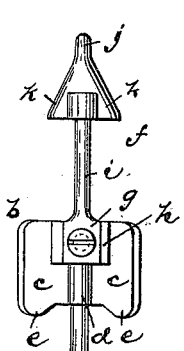
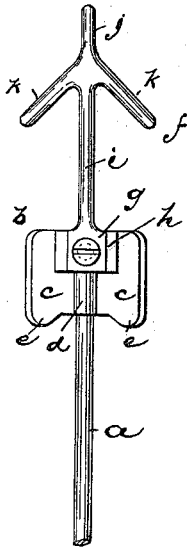
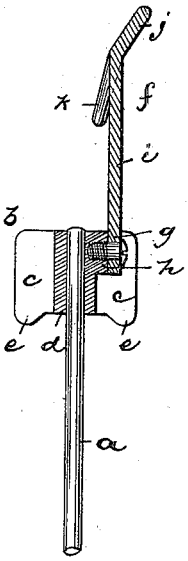
Fig. 7.　　Fig. 1.　　Fig. 2.　　Fig. 9.
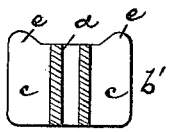
Fig. 8.
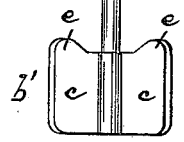
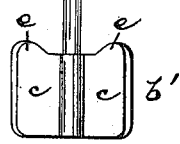
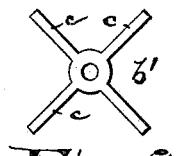
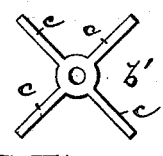
Fig. 5.　　Fig. 6.
Inventor, James Arnot,
by Drake, attys.
Witnesses.

No. 617,216. Patented Jan. 3, 1899.
J. ARNOT.
PILOT WIRE ROD FOR ELECTRICAL CONDUITS.
(Application filed May 24, 1898.)
(No Model.) 4 Sheets—Sheet 2.

Inventor:
James Arnot,
By Drake & Co.
Attys.

A. R. Krousse
Russell M. Everett
Witnesses.

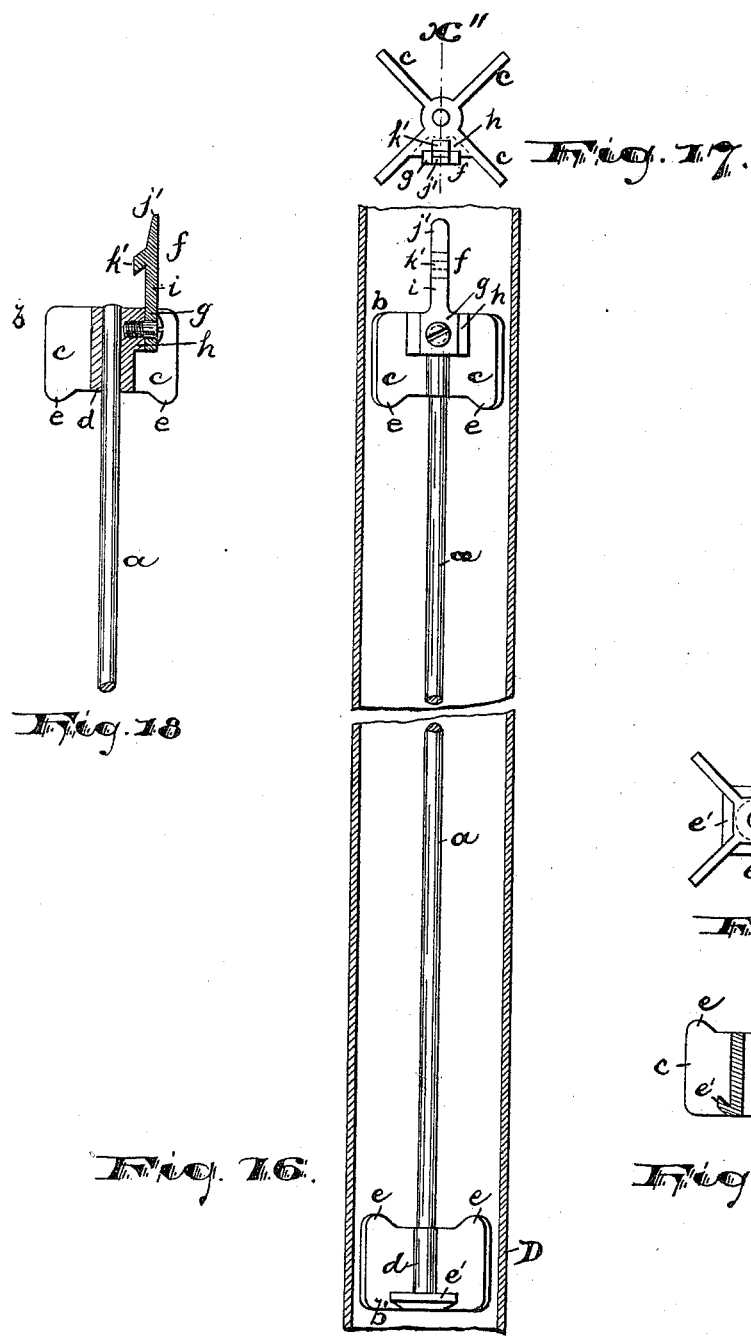

No. 617,216. Patented Jan. 3, 1899.
J. ARNOT.
PILOT WIRE ROD FOR ELECTRICAL CONDUITS.
(Application filed May 24, 1898.)
(No Model.) 4 Sheets—Sheet 4.
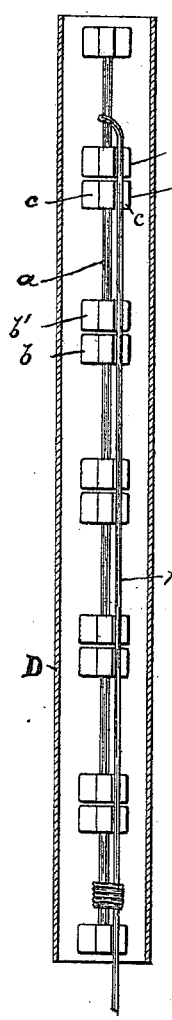
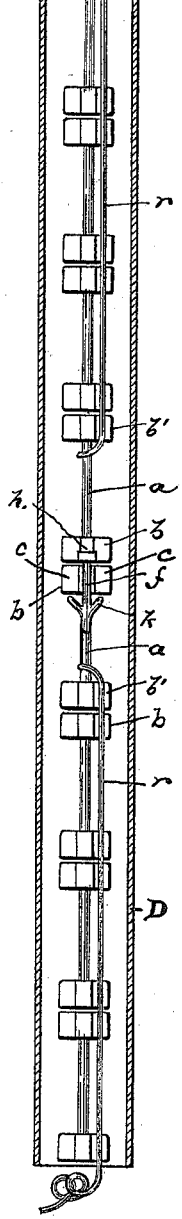
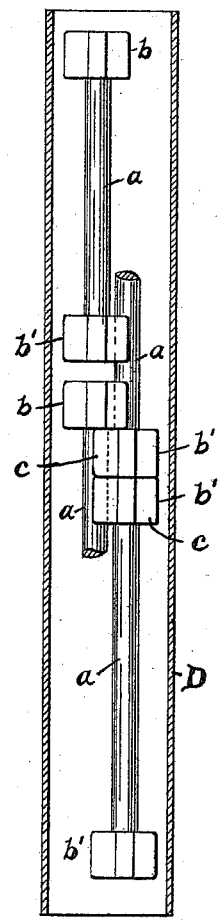
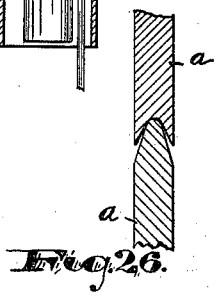
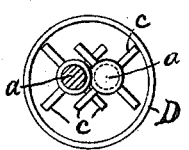
WITNESSES:
A. R. Krause
Russell M. Everett
INVENTOR
James Arnot,
BY Drake
ATTORNEYS.

UNITED STATES PATENT OFFICE.

JAMES ARNOT, OF KEARNY, NEW JERSEY.

PILOT-WIRE ROD FOR ELECTRICAL CONDUITS.

SPECIFICATION forming part of Letters Patent No. 617,216, dated January 3, 1899.

Application filed May 24, 1898. Serial No. 681,599. (No model.)

*To all whom it may concern:*

Be it known that I, JAMES ARNOT, a citizen of the United States, residing at Kearny, in the county of Hudson and State of New Jersey, have invented certain new and useful Improvements in Pilot-Wire Rods for Electrical Conduits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The objects of this invention are to facilitate the operation of laying electrical conducting-cables in underground conduits, and to secure other advantages and results, some of which may be referred to hereinafter in connection with the description of the working parts.

The invention consists in the improved apparatus for inserting pilot-wires through the conduits, and in the arrangements and combinations of parts, all substantially as will be hereinafter set forth, and finally embraced in the clauses of the claim.

Figure 13:
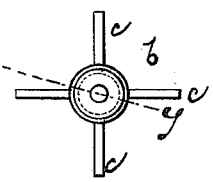
Figure 14:
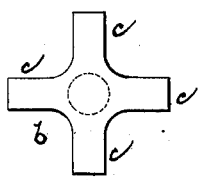
Figure 15:
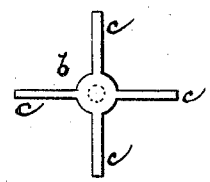
Figure 10:
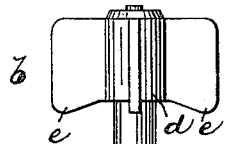
Figure 10:
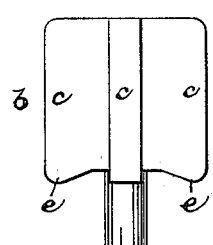
Figure 10:
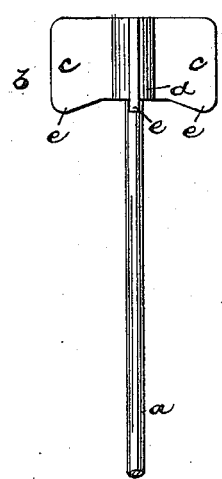
Figure 10:
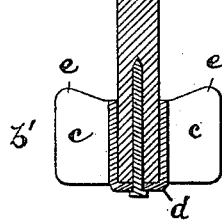
Figure 11:
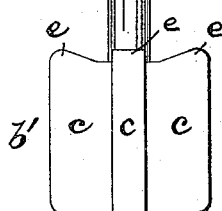
Figure 12:
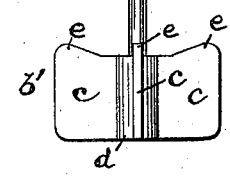

Referring to the accompanying drawings, in which like letters of reference indicate corresponding parts in each of the several views, Figures 1 and 2 are plans showing certain rods adapted to be thrust or drawn through the conduit or pipes for the electric wires, showing variations in the construction of rods. Figs. 3 and 4 are forward end views, and Figs. 5 and 6 are rear end views, of the same. Figs. 7 and 9 are sectional views taken on lines $x$ and $x'$, respectively, of Figs. 3 and 4. Fig. 8 is a sectional detail of a certain tailpiece of said rods. Figs. 10, 11, and 12 are plans showing further variations in the construction of the rods. Figs. 13, 14, and 15 are end views of said variations, Fig. 10 being partly in section through line $y$, Fig. 13. Fig. 16 illustrates another variety of the rod arranged within the tubular conduit. Fig. 17 is a forward end view of this last variety of rod. Fig. 18 is a section taken on line $x''$, Fig. 17. Fig. 19 is a rear end view of the variety of rod shown in Fig. 16, and Fig. 20 is a central longitudinal section of the same. Fig. 21 is a longitudinal section of a conduit filled with non-coupling rods, with a draw-rope attached to the first section and lashed at the rear section and ready to have the pilot-wire attached to the said rear section. Fig. 22 is a section of a conduit filled with rods, all of which are of a non-coupling type with the exception of those at the center, which are of a self-coupling type. In this view I intend to show half of the rods forced into the conduit from one end and the other half from the opposite end, the self-coupling inner end sections being each provided with a draw-rope. Furthermore, in this view the self-coupling sections are shown coupled and a coil of rope is shown ready to be made fast to the rear section, as in Fig. 21, to the end of which rope or to the said rear section the pilot-wire may be made fast. Fig. 23 indicates a section of a conduit filled with plain straight rods, the diameters of which in cross-section are greater than half the diameter of the conduit chamber or passage, so that no one section can pass another in the conduit. To the forward section is attached a draw-rope which can be lashed to the rear section and a pilot made fast to the latter. Figs. 24 and 25 are respectively a longitudinal section and an end view of a conduit with three rods therein. The center rod is shown broken near the center. The broken ends have passed through between the wings of the other two rods, the view showing that the broken ends will not jam or clog with the walls of the conduit, but will be free to be drawn or pushed out of the duct with the other rods when the hubs in which the shafts are inserted and the wings or runners are sufficiently small to prevent such jamming. Fig. 26 is another longitudinal section showing another variation of construction in the non-coupling type of sections, in which case the greatest transverse diameter of the section may be less than half the diameter of the conduit-passage and effect a useful result.

In the operation of laying electrical cables in underground tubes or conduits it is ordinarily necessary or desirable to first insert in said conduit what is known as a "pilot" wire or rope wherewith to draw another and larger rope or cable, the said pilot-wire being adapted to extend from one manhole of the conduit to the next to enable the workmen at the forward hole to draw the larger cable applied to the end of said pilot-wire at the rear hole. To introduce said pilot-wire through said conduit, it is common to couple short stiff rods or sections together and push them through said conduit, the pilot-wire being attached to the rear or last rod or section and the free sections being positively coupled to the joined sections one after another as the said long rod formed by said joined sections is pushed forward with the pilot-wire.

Among the coupling means provided for attaching the short rods or sections one to another are male and female screws fixed to the meeting ends of said rods. In this construction, which is the one most commonly employed, the screw-threads quickly wear or become damaged, and thus are liable to become uncoupled when between the manholes. Furthermore, in ordinary practice this construction requires two men at each hole to manipulate the rods in coupling said rods at one hole and taking them apart at the other. The other varieties of couplings of which I am aware also become disconnected by couplings breaking, and are open to other objections—such, for example, as that the complicated couplings make the rods heavy and difficult to force through the conduit as the jointed sections are screwed together. When these joints break, it is worse than in the case of a screw-joint, for it is sometimes possible to screw the latter together again; but when the others break all beyond the break is beyond control, and to get them out the street must be dug up, and if the pilot-wire is in a lower duct it will be necessary to cut through all the ducts above it to gain access to the lost end, all of which involves a great loss of time, labor, and money.

In said drawings, $a$ indicates the shaft of the rod. This may be of hard wood, as in Figs. 10 and 11, or of metal, as in Figs. 1, 2, 12, and 16. At the opposite ends of said rod are formed or fastened head and foot pieces $b\ b'$, each provided with radial wings $c\ c$, which extend out to or near to the interior wall of the tubular conduit D, Fig. 16, the extreme edges of said wings forming runners, which raise the shaft $a$ from frictional contact with the inside walls of the conduit, and thus reduce the power required in pushing said shaft or rod through the said conduit.

The radial wings $c$ have openings between to permit the passage of the draw-rope therethrough. The winged head and foot pieces form abutments which prevent the sections from overlapping or one section passing to the side of the next in order and becoming wedged in the conduit, as will be evident upon examination of Fig. 16. As the center of the head and foot pieces I prefer to provide each with a socket $d$, into which the shaft $a$ when not integral with the said head and foot pieces may be inserted and held by screws, pins, or the like, or in any suitable manner.

From the back ends of the heads and forward ends of the foot-pieces project protuberances $e$. These are preferably formed at the ends of the wings $c$, integral therewith, and serve as hooks upon which a "fisher" or clutch projection $f$ of the connecting-rod section may be caught. When said clutch projection $f$ is employed, I prefer to give it an arrow-head shape—such, for example, as is shown in Figs. 1, 2, 3, 4, 7, and 9. In these figures the said arrow-head projections are shown as being provided with feet $g$, fastened by screws upon suitable bearings $h$, formed in the angular spaces between the wings. From said feet project shanks $i$, at the front ends of which is formed integrally or otherwise the clutching-head. This consists of a forward guide $j$, which is or may be bent down, as in Figs. 7 and 9, so that the said head will be directed with less chance for interference beneath the foot-piece of the connecting-rod section. Back of the said guides $j$ are rearwardly-diverging upwardly-turned catching-arms $k$. These engage the foot-piece of the next forward section and, passing through an opening between the wings $c\ c$, tend to raise said foot-piece, so that subsequently said foot-piece will fall by gravity into catching or clutching relation, the backwardly-extending arms $k$ interlocking with the protuberances $e$ to prevent detachment by draft from the front.

In order to insert a pilot-wire in a conduit by means of the non-coupling sections capable of being easily thrust through the conduit, (shown in Figs. 10, 11, and 12,) I attach a draw-rope $r$ to the first section, and when said first section has reached the forward manhole I make fast the said draw-rope to the last section, as shown in Fig. 21, and also make fast a pilot-wire to the said last section. As the sections are drawn out at the forward manhole the pilot-wire is drawn in at the rear, so that by the time the last section is drawn out the pilot-wire will have been drawn through the conduit.

Under some circumstances, and especially where the space between the manholes is very long, I prefer to operate as follows: The workmen at the front and rear manholes each introduce the sections from the respective ends of the conduit, the first sections introduced forming a self-coupling pair of the type shown in Figs. 1 and 2, and the subsequent sections being preferably of the non-coupling type of Figs. 10, 11, and 12. To the first sections introduced from the front and rear are attached draw-ropes $r$ for draft purposes. As the first section and its draw-rope are forced forward from the rear the operator in the forward manhole pushes rearward a section to couple therewith and a second rope. These first sections meet about the middle of the conduit and automatically couple by simple end pressure, as will be understood by reference to Fig. 22. After the rod-sections are brought into coupling engagement, as described, the operator at the rear manhole makes fast the end of the long rear draft-rope, which may be considerably longer than the length of the circuit, to the last section introduced by him and makes fast the pilot-wire also to the last section. He then climbs out of his manhole and goes forward to said forward manhole to help the operator stationed there. The forward operator begins pulling immediately after the coupling on his draft-rope attached to the coupling-section, so that the coupled rods, with the pilot-wire and draft-rope attached, are drawn forward; but because of the length of the rear draft-rope the rear sections are allowed to remain stationary within the conduit for a time and only those sections forward of the coupling-joint are drawn forward at first, and thus the forward draft-rope is relieved of a portion of the weight or the frictional strain of the sections until all the slack or fullness in the rear rope is taken up, at which time all the forward sections and the pilot-wire will have been drawn to the second manhole. The second or rear series of rods will then in turn be drawn forward to the second manhole with the pilot-wire. The rods within the sections are thus divided into two parts which are drawn at different times, enabling a single man, ordinarily, by this division of labor to accomplish the work easily. The rods upon being drawn out will automatically fall apart and drop into the manhole without any manipulation being required. This also conduces to economy of time and labor, as will be apparent.

I am aware that various modifications may be made in the construction of my invention without departing from the spirit or scope of the invention. Some of these I have illustrated in the drawings. Figs. 1 and 2 illustrate a wire shaft $a$, while Figs. 10 and 11 show a large shaft of wood. Figs. 1 and 2 also show different varieties of coupling arrow-heads, the diverging arms being in pairs in both. Figs. 16 and 18 show a single arm $k'$, and the foot-piece is furnished near or at the center with catch projections or ribs $e'$, as shown in Figs. 16, 19, and 20, onto which the single arm or hook may be caught. Figs. 10, 11, and 12 show a construction devoid of coupling means, the head and foot pieces being simple abutments larger in diameter than half the diameter of the conduit, so that the head-abutment of one section will certainly engage the foot-abutment of the next forward section. In Fig. 26 I show still another modification in which the widest width or thickness of the rod-section may be less than half the width of the conduit-passage. In this case I form the one rod end concave and the meeting end of the opposite rod convex. These rods, guided into longitudinal alinement by the trough of the conduit, will engage and automatically retain operative relation by end pressure, as will be understood.

Other modifications and variations may be made to suit special conditions without departing from the invention.

Having thus described the invention, what I claim as new is—

1. The combination with the shaft $a$, of head and foot pieces provided with radial wings serving as runners, the said head and foot pieces serving as abutments preventing the overlapping of sections within the conduit, substantially as set forth.

2. The improved pilot-wire rod comprising sections having shafts $a$, and radial runners disposed at the ends of said shafts and holding said shafts from frictional contact with the conduit, said parts being combined, substantially as set forth.

3. The improved pilot-wire rod comprising sections having runners disposed at the opposite ends thereof, said runners having end protuberances $e$, onto which coupling attachments may be coupled, substantially as set forth.

4. The combination with a tubular conduit, having a passage longitudinally therethrough for the electrical wires of a series of pilot-wire-rod sections, having a diameter at their extremities greater than one-half the diameter of the conduit-chamber, whereby the said pilot-wire-rod sections will be held in alinement, substantially as set forth.

5. The combination with the conduit, of a series of pilot-wire-rod sections having abutting extremities greater than one-half the diameter of the interior chamber of said conduit, the said abutting extremities being provided with coupling means, substantially as set forth.

6. The combination with the tubular conduit, of a series of shafts having head and foot pieces attached to the ends of said shafts, the said head and foot pieces being of a size in cross-section greater than one-half of the diameter of the chamber in said conduit, whereby they will be prevented from passing one another within said conduit, substantially as set forth.

7. The combination with the conduit, of a series of shafts having head and foot pieces, the foot-pieces being provided with suitable ribs or shoulders and the head-pieces being provided with arrow-like forward projections adapted to couple automatically with the said ribs or shoulders, substantially as set forth.

8. The combination with the conduit, of a series of pilot-wire-rod sections, each provided with an arrow-like, forward coupling projection, substantially as set forth.

9. The combination with the conduit, of a sectional pilot-rod, each section of which is provided with a projection having inclined rearwardly-extending arms $k$, adapted to couple with the next contacting section, and occasion a lifting of one section, whereby it may automatically drop into clutching engagement, substantially as set forth.

10. The combination with the conduit, of pilot-wire-rod sections having meeting ends adapted to enter automatically into coupling relation when the rods are pushed in from opposite ends of the conduit, substantially as set forth.

11. The combination with the conduit, of a series of pilot-wire-rod sections, the diameter of which, in cross-section of the ends, is greater than one-half the diameter of the chamber of said conduit, whereby they will be prevented from passing one another within said conduit, substantially as set forth.

12. The combination with the conduit, of a series of pilot-wire-rod sections, the head and foot pieces of which are of greater diameters than the intermediate shafts, substantially as set forth.

13. The combination with the conduit, of a series of short rod-sections, without couplings, and a draw-rope for the purpose of withdrawing said sections from the conduit, substantially as set forth.

14. The combination with the conduit, of a series of short rod-sections with self-coupling ends, and a draw-rope attached to the first section, substantially as set forth.

15. The combination with the conduit, of a series of short rods the first of which has coupling means at its front end, and a draw-rope wire attached to the first section introduced and put in the conduit as a means of safety in case of the uncoupling of rod-sections or the breaking of couplings and for the purpose of withdrawing the uncoupled sections, substantially as set forth.

16. The combination with the conduit, of a series of pilot-wire-rod sections, the diameter of which in the cross-section of the ends is greater than one-half the diameter of the chamber of said conduit, and a draw-rope attached to the first section, substantially as set forth.

17. The combination with the conduit, of a series of pilot-wire-rod sections, having enlargements or heads at their opposite ends greater in diameter than one-half the diameter of the interior chamber of said conduit, the said heads or enlargements being peripherally recessed to permit the passage of the body of a rod-section, if broken, without jamming, substantially as set forth.

In testimony that I claim the foregoing I have hereunto set my hand this 1st day of March, 1898.

JAMES ARNOT.

Witnesses:
CHARLES H. PELL,
C. B. PITNEY.